United States Patent Office 3,187,060
Patented June 1, 1965

3,187,060
PROCESS FOR HYDROFLUORINATION OF ACETYLENIC HYDROCARBONS
Roland Petit, Paris, Claude Kaziz, La Courneuve, and Georges Wetroff, Le Thillay, France, assignors to Produits Chimiques Pechiney-Saint-Gobain, Neuilly-sur-Seine, France
No Drawing. Filed Mar. 18, 1963, Ser. No. 266,048
Claims priority, application France, Mar. 20, 1962, 891,627
8 Claims. (Cl. 260—653.4)

This invention relates to the hydrofluorination of acetylenic hydrocarbons and it relates more particularly to the hydrofluorination of acetylene while in gaseous phase.

It is well known to prepare vinyl fluoride by the action of hydrofluoric acid on acetylene, in gaseous phase, in the presence of a catalyst which can be a metallic fluoride, and in particular aluminum fluoride, a natural or activated alumina or a mixture of these compounds. Such catalysts are obtained either by impregnation of alumina by means of a solution of metallic fluoride, or by pelleting a mixture of powdered alumina and metallic fluoride with the use of a binder, such as graphite or hydrogenated corn oil. The use of such catalysts leads to reaction mixtures containing, in addition to unreacted acetylene, equimolar quantities of vinyl fluoride and 1,1-difluoroethane. The use of a catalyst, consisting essentially of aluminum fluoride, also leads to a low yield of vinyl fluoride; moreover, it exhibits the severe drawback of limiting the activity of the catalyst to a very small volume of the catalytic bed and thus creates an undesirable temperature gradient within the reactor.

Another process of hydrofluorination consists in causing acetylene and hydrogen fluoride to react according to the process previously mentioned, separating the 1,1-difluorethane from the effluent for recycle through the same reactor with a predetermined quantity of acetylene, without changing the initial feed in acetylene and in hydrogen fluoride. Although this method provides for an increase in the rate of transformation of acetylene to vinyl fluoride, it requires a greater number of operations for separation and recycling of the difluorethane and it also requires more equipment and controls, particularly for the handling of large volumes of gas and the delicate adjustments between the amounts of ingredients.

It is an object of this invention to provide a new and improved process for the hydrofluorination of acetylenic hydrocarbons and it is a related object to provide a process of the type described which overcomes many of the objectionable features of previous processes of the types described.

More specifically, it is an object of this invention to provide a process of the type described in which greater selectivity is achieved in the fluorination of acetylenic hydrocarbon reaction and which produces a higher yield of fluorinated olefins; which offers the advantage of achieving a more efficient and effective use of the means employed by lowering the temperature gradient resulting from more favorable heat exchanges in the catalytic bed and which thereby broadens the reaction zone in the catalytic bed and which also avoids the necessity for recycling to achieve a desirable yield of the intended end product.

In accordance with the practice of this invention, the hydrofluorination of acetylenic hydrocarbons, and particularly acetylene, while in the gaseous phase, is carried out by bringing a mixture of hydrofluoric acid and the acetylenic hydrocarbon in the proportions of hydrofluoric acid to hydrocarbon of unity or slightly above when based upon molar ratios, into contact with a catalytic mass at a temperature within the range of 200° C. to 400° C., and preferably 240° C. to 300° C., and wherein the catalytic mass consists essentially of a mixture which includes a diluent such as practically inert sintered alumina and a catalytic agent, in which the diluent is present in an amount within the range of 50% to 95% by volume of the catalytic mass and preferably 65% to 90% by volume, and in which the catalytic agent is present in an amount within the range of 50% to 5% by volume and preferably 35% to 10% by volume with the lower amount of catalyst being present with the higher amount of diluent in the order set forth, and vice versa.

The sintered alumina, employed as the diluent, is characterized by the following:

Total porous volume of between 5 and 50 cm.$^3$ per 100 g. of alumina.
Specific surface area of between 0.01 m.$^2$/g. and 1 m.$^2$/g.

The thermal conductivity of the mixture making up the catalytic bed is sufficient to secure removal of the heat of reaction evolved during the hydrofluorination.

As the catalytic agent, it is preferred to make use of aluminum fluoride prepared by the fluorination of a solid aluminum derivative, such as activated alumina, aluminum nitrate and preferably an anhydrous aluminum derivative such as an aluminum halide and preferably aluminum chloride. Such catalytic agent can be prepared by processes well known to the art, such for example as by reaction of gaseous hydrofluoric acid and/or fluorine (which might be diluted with an inert gas such as nitrogen) with said aluminum derivative at a temperature below the thermal decomposition temperature of any of the reactants and for a period of time sufficient to convert the aluminum derivative to aluminum fluoride.

In another method that can be used for the preparation of the catalytic mass in accordance with the practice of this invention, pieces of aluminum compound to be fluorinated and porous sintered alumina are mixed and then treated with a gaseous stream of hydrofluoric acid and/or fluorine until the aluminum compound is transformed in situ to the corresponding aluminum fluoride. In the preferred practice the preparation of the catalytic mass as described above is carried out in the same reactor in which the hydrofluorination is to be carried out whereby the hydrofluorination reaction can be conducted in the same reactor immediately after the preparation of the catalytic mass.

The granulometry or particle size distribution of the components of the catalytic mass is selected to achieve optimum thermal conductivity on the one hand and is a desired resistance to attrition on the other hand.

The following example is given by way of illustration, but not by way of limitation, of the invention:

*Example 1*

Two volumes of anhydrous aluminum chloride having a particle size of 2 to 10 mm. are intimately mixed with five volumes of balls of 2 to 5 mm. diameter of porous sintered alumina, the main characteristics of which are as follows:

Total porous volume _____ 12 cm.$^3$/100 g. of alumina.
Specific surface area _____ 0.05 m.$^2$/g.
α-Crystals of alumina _____ Of very homogeneous size ranging from 5 to 10 microns.

A stainless steel tubular reactor of 3 cm. external diameter and 1.50 m. long is loaded with 800 cm.$^3$ of the above mentioned prepared mixture. This mixture is then treated with a gaseous current containing an equimolar proportion of nitrogen and hydrofluoric acid, at a flow rate of 2 moles per hour, and at a temperature not exceeding 100° C. and for a time ranging from 10 to 12 hours. The fluorination reaction is completed by progressively increasing the temperature up to 300° C. The mixture thus treated constitutes the catalytic mass to be employed.

The reaction for the hydrofluorination of acetylene is carried out by fixing the temperature of the reactor at 280° C. by means of an electric furnace and by passing a gaseous mixture of acetylene and hydrofluoric acid through the reactor, at atmospheric pressure, in equimolecular proportions and in an amount to establish a space velocity of about 110 volumes of gas per volume of catalyst per hour. Under these conditions, the temperature of the reaction zone is maintained below 300° C. and with a relatively uniform temperature distribution through the catalytic mass. Analysis of the gases evolved, after eliminating unreacted acid, indicates an 80% rate of transformation of acetylene into organic fluorinated derivatives containing 78% molar of vinyl fluoride and 22% molar of 1,1-difluorethane. These values are maintained over more than 200 hours of continuous operation of the catalytic mass.

For purposes of comparison and to illustrate the improvements obtained by the practice of this invention, the following table summarizes the results of different tests carried out in accordance to the process of the invention as compared to other well known processes:

| Parameters | Catalysts | | | | | | | | |
|---|---|---|---|---|---|---|---|---|---|
| | A | | B | | C | | D | E | |
| Molar ratio, HF/C$_2$H$_2$ | 1.6-1.8 | | 2 | | 2 | 1 | | 2 | 1 |
| Space velocity of the reactants (v./v./h.) | 73-77 | | 85 | | 85 | 110 | 110 | 85 | 110 |
| Temperature of the walls of the tubular reactor (° C.) | 270 | 300 | 260 | 300 | 240 | 240 | 240 | 240 | 280 |
| Temperature of the warm zone (° C.) | 305 | 320 | 325 | 340 | 320 | 340 | 300 | 290 | 300 |
| Length of the reacting zone (cm.) | 5 | 5 | 5 | 6 | 3 | 4 | 40 | 35 | 50-55 |
| Duration of the test (h.) | 40 | 75 | 40 | 80 | 85 | 150 | 110 | 60 | 150 |
| Rate of transformation of C$_2$H$_2$ (percent by volume) | 82 | 40 | 90 | 50 | 95 | 80 | 67 | 85 | 80 |
| Yield in vinyl fluoride (percent by volume) | 54 | 60 | 30 | 55 | 30 | 52 | 60 | 40 | 78 |
| Yield in 1,1-difluorethane (percent by volume) | 46 | 40 | 70 | 45 | 70 | 48 | 40 | 60 | 22 |

In the above table:

A—AlF$_3$ (81% by weight) pelleted with a binder consisting of activated alumina (15% by weight) and graphite (4% by weight).
B—Activated alumina.
C—AlF$_3$ in pieces.
D—AlF$_3$ diluted with charcoal.
E—AlF$_3$ diluted with porous sintered alumina according to the invention.
V./v./h.—Gaseous volume per volume of catalyst and per hour.

The catalysts A, C, D and E were prepared by the action of a current of hydrofluoric acid, either diluted or not diluted by nitrogen, on activated alumina or on anhydrous aluminum chloride. In all cases the fluorination is completed at 300° C.

Results of supplementary tests, carried out on the above mentioned catalysts, and which are not mentioned in the preceding table, show a progressive decrease in the rate of transformation of acetylene in the course of time. Thus at 300° C. this rate of transformation reaches about 35% in volume after an 80 hour period of test with catalyst A and about 42% in volume after 100 hours test with catalyst B. On the other hand, the rates of transformation are substantially constant as the test time increases when catalysts C, D and E are employed.

The catalytic composition D is not satisfactory because it favors the transformation of excessive quantities of tars on the charcoal surface. This tar formation is negligible with the catalytic mass E which contains porous sintered alumina as a diluent.

It will be apparent from the foregoing that we have provided a marked improvement in the method for the fluorination of acetylenic hydrocarbons and particularly in the preparation of vinyl fluoride as a final product from the fluorination of gaseous acetylene.

It will be understood that various changes may be made in the details of the formulation, materials and equipment without departing from the spirit of the invention, especially as defined in the following claims.

We claim:

1. In the process of hydrofluorination of an acetylenic hydrocarbon, the steps of contacting a mixture of hydrofluoric acid and acetylenic hydrocarbon with a catalytic mass at a temperature within the range of 200° C. to 400° C. and wherein the hydrofluoric acid and acetylenic hydrocarbon are present in the ratio calculated on a molar basis of hydrofluoric acid to acetylenic hydrocarbon of at least unity and wherein the catalytic mass consists essentially of a mixture formed of at least 50 percent by volume but not more than 95 percent by volume of a substantially inert, porous, sintered alumina as a diluent free of catalytic effect and having a porous volume of 5 to 50 cm.$^3$/100 grams and a specific surface of 0.01 to 1 m.$^2$/gram and uniformly distributed throughout the catalytic mass, and a catalytic agent.

2. In the process of hydrofluorination of an acetylenic hydrocarbon, the steps of contacting a mixture of hydrofluoric acid and acetylenic hydrocarbon with a catalytic mass at a temperature within the range of 200° C. to 400° C. and wherein the hydrofluoric acid and acetylenic hydrocarbon are present in the ratio calculated on a molar basis of hydrofluoric acid to acetylenic hydrocarbon of at least unity, the improvement wherein the catalytic mass consists of a mixture of practically inert, porous, sintered alumina as diluent having a total porous volume of between 5 to 50 cm.$^3$/100 grams and a specific surface of between 0.01 and 1.0 m.$^2$/gram and uniformly distributed throughout the catalytic mass, and aluminum fluoride, and in which the materials are present in the mass in the ratio of 50 to 95 parts by volume of the porous sintered alumina to 5 to 50 parts by volume of aluminum fluoride.

3. In the process of hydrofluorination of an acetylenic hydrocarbon, the steps of contacting a mixture of hydrofluoric acid and acetylenic hydrocarbon with a catalytic mass at a temperature within the range of 200° C. to 400° C. and wherein the hydrofluoric acid and acetylenic hydrocarbon are present in the ratio calculated on a molar basis of hydrofluoric acid to acetylenic hydrocarbon of at least unity, the improvement wherein the catalytic mass consists of a mixture of practically inert, porous, sintered alumina as diluent having a total porous volume of between 5 to 50 cm.$^3$/100 grams and a specific surface of between 0.01 and 1.0 m.$^2$/gram and uniformly distributed throughout the catalytic mass, and aluminum fluoride, said catalytic mass is obtained in situ in the hydrofluorination reactor by the steps of mixing pieces of said porous sintered alumina with an aluminum compound selected from the group consisting of activated alumina, aluminum nitrate and aluminum halide, treating the mixture with a gas selected from the group consisting of hydrofluoric acid, fluorine and mixtures thereof at a temperature below the decomposition temperature for any of the reactants.

4. The process as claimed in claim 3 in which the gas is diluted with an inert gas.

5. The process as claimed in claim 3 in which the aluminum compound is an anhydrous derivative of aluminum.

6. The process as claimed in claim 3 in which the aluminum compound is an aluminum halide.

7. The process as claimed in claim 1 in which the materials are present in the catalytic mass in the direct proportion of 10% to 35% by volume catalytic agent to 90% to 65% by volume porous sintered alumina.

8. The process as claimed in claim 3 in which the gaseous treatment is carried out until transformation of the aluminum compound to aluminum fluoride.

References Cited by the Examiner
UNITED STATES PATENTS

| | | | |
|---|---|---|---|
| 2,471,525 | 5/49 | Hillyer et al. | 260—653.4 |
| 2,574,480 | 11/51 | Hillyer et al. | 260—653.4 |

FOREIGN PATENTS 805,503   12/58   Great Britain.

LEON ZITVER, *Primary Examiner.*
DANIEL D. HORWITZ, *Examiner.*